United States Patent
Sakamoto

(10) Patent No.: US 10,764,457 B2
(45) Date of Patent: Sep. 1, 2020

(54) PREVENTING COMPONENT COLLISION IN IMAGE READING APPARATUS DURING CHANGE OF STATE

(71) Applicant: SEIKO EPSON CORPORATION, Tokyo (JP)

(72) Inventor: Naoki Sakamoto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/552,137

(22) Filed: Aug. 27, 2019

(65) Prior Publication Data
US 2020/0076977 A1    Mar. 5, 2020

(30) Foreign Application Priority Data

Aug. 30, 2018 (JP) .................................. 2018-161131

(51) Int. Cl.
*H04N 1/00* (2006.01)
*H04N 1/407* (2006.01)

(52) U.S. Cl.
CPC ..... *H04N 1/00891* (2013.01); *H04N 1/00236* (2013.01); *H04N 1/407* (2013.01); *H04N 2201/0081* (2013.01)

(58) Field of Classification Search
CPC ........... H04N 1/00891; H04N 1/00236; H04N 1/407; H04N 2201/0081
USPC ....................................................... 358/1.13
See application file for complete search history.

(56) References Cited

U.S. PATENT DOCUMENTS

| | | | |
|---|---|---|---|
| 2013/0188991 A1* | 7/2013 | Kawata | G03G 15/2028 399/122 |
| 2014/0294476 A1* | 10/2014 | Hashimoto | B41J 3/60 399/361 |
| 2015/0210503 A1* | 7/2015 | Osada | B65H 37/04 270/1.01 |
| 2016/0062272 A1* | 3/2016 | Fujiwara | G03G 15/0887 399/27 |
| 2017/0142288 A1 | 5/2017 | Yoshita | |

FOREIGN PATENT DOCUMENTS

JP       2017-098609 A    6/2017

* cited by examiner

*Primary Examiner* — Allen H Nguyen
(74) *Attorney, Agent, or Firm* — Workman Nydegger

(57) ABSTRACT

A second unit configured to be opened or closed with respect to a first unit includes a background plate configured to be switched between a facing state in which the background plate faces a image sensor and a non-facing state in which the facing state of the background plate and the image sensor is released and a power receiving section configured to receive power from a motor to switch the state of the background plate. The first unit includes an intermediate cam configured to be rotated by the power from a motor and a cam member configured to receive the power of the motor via the intermediate cam, the cam member having a receiving section of a size the power receiving section is received regardless of a position of the power receiving section when the intermediate cam is in the neutral position.

5 Claims, 10 Drawing Sheets

PREVENTING COMPONENT COLLISION IN IMAGE READING APPARATUS DURING CHANGE OF STATE

The present application is based on, and claims priority from JP Application Serial Number 2018-161131, filed Aug. 30, 2018, the disclosure of which is hereby incorporated by reference herein in its entirety.

BACKGROUND

1. Technical Field

The present disclosure relates to an image reading apparatus for reading an image of a document.

2. Related Art

Hereinafter, as an example image reading apparatus, a scanner will be described. A scanner reads an image of a document using an image sensor, typically, a contact image sensor (CIS), a charge coupled device (CCD) image sensor, or the like. Such a scanner has a background plate provided so as to face the image sensor. The background plates are used for so-called shading correction. Example background plates include resin plates of white, gray, or black, or metal plates coated in white, gray, or black. To a background plate, reading is performed by an image sensor, and the read value is compared with a read value obtained by reading of a document. Based on the difference, read data is generated.

JP-A-2017-098609 discloses an image reading apparatus configured to switch a background color to either white or black. The image reading apparatus disclosed in JP-A-2017-098609 includes a lower component and an upper component, and a cam disposed in the upper component is rotated by a driving device disposed in the lower component so as to switch the background color of the upper component to either white or black.

In the image reading apparatus disclosed in JP-A-2017-098609, when the upper component is opened with respect to the lower component, the cam disposed in the upper component and the driving device disposed in the lower component are separated. In closing the upper component from the opened state, the cam disposed in the upper component may collide with the driving device disposed in the lower component, and the cam and/or the driving device may be damaged.

SUMMARY

According to an aspect of the present disclosure for solving the above-mentioned problem, an image reading apparatus includes a first unit including a first image sensor configured to read a first side of a document, and a second unit configured to be opened or closed with respect to the first unit, the second unit including a second image sensor configured to read a second side opposite to the first side of the document. The first unit includes a first background plate configured to be switched between a facing state in which the first background plate faces the second image sensor and a non-facing state in which the facing state of the first background plate and the second image sensor is released. The second unit includes a second background plate configured to be switched between a facing state in which the second background plate faces the first image sensor and a non-facing state in which the facing state of the second background plate and the first image sensor is released, and a power receiving section configured to receive power from a motor to switch the state of the second background plate. The first unit includes the motor, an intermediate cam configured to be rotated by the power from the motor, a holding member configured to hold the intermediate cam in a neutral position in a state in which the power of the motor is not transmitted to the intermediate cam, and a cam member configured to receive the power of the motor via the intermediate cam, the cam member having a receiving section of a size the power receiving section is received regardless of a position of the power receiving section when the intermediate cam is in the neutral position, the cam member configured to move the power receiving section by rotation.

DESCRIPTION OF EXEMPLARY EMBODIMENTS

Figure 1:
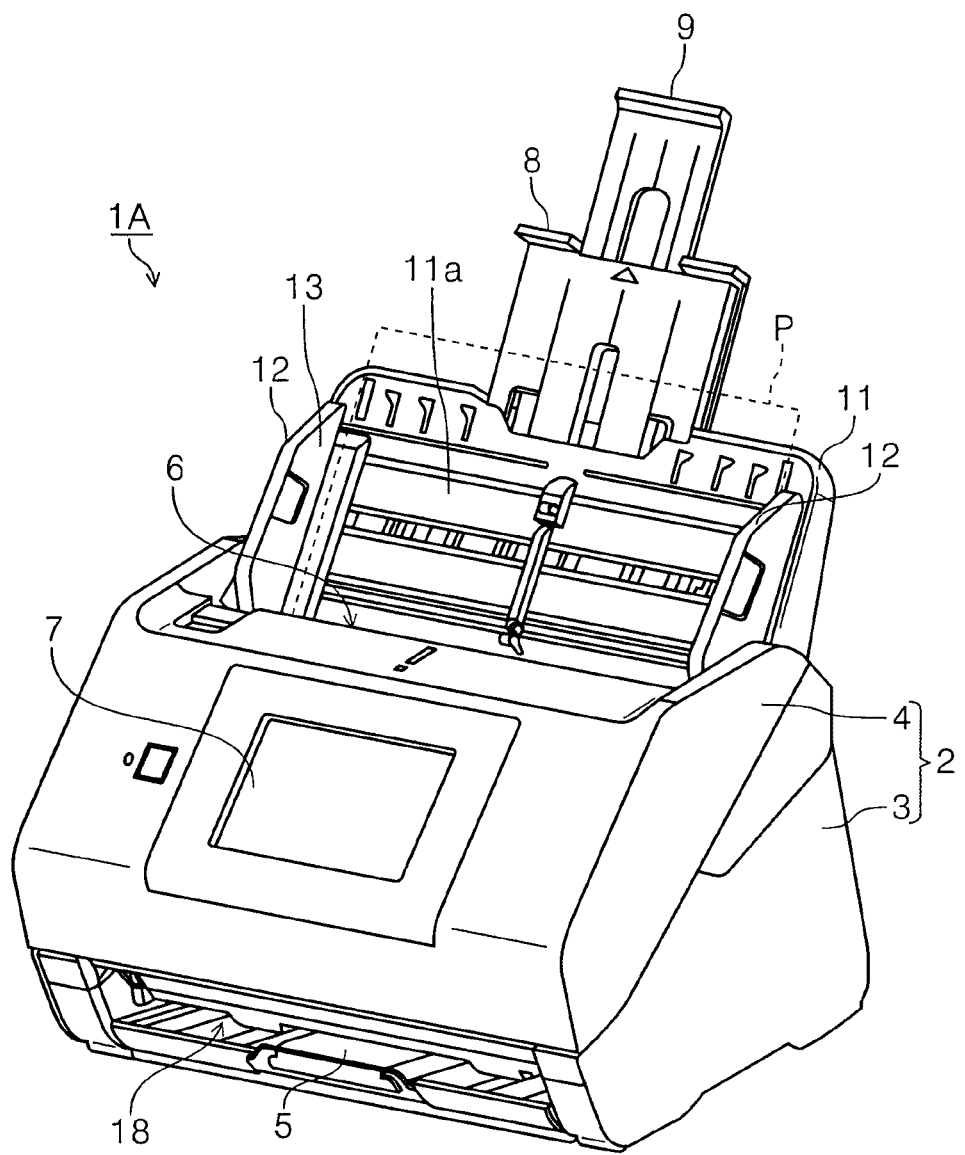
FIG. 1 is an external perspective view of a scanner according to an embodiment of the present disclosure.

Hereinafter, embodiments of the present disclosure will be schematically described. An image reading apparatus according to a first aspect of the present disclosure includes a first unit including a first image sensor configured to read a first side of a document, and a second unit configured to be opened or closed with respect to the first unit, the second unit including a second image sensor configured to read a second side opposite to the first side of the document. The first unit includes a first background plate configured to be switched between a facing state in which the first background plate faces the second image sensor and a non-facing state in which the facing state of the first background plate and the second image sensor is released. The second unit includes a second background plate configured to be switched between a facing state in which the second background plate faces the first image sensor and a non-facing state in which the facing state of the second background plate and the first image sensor is released, and a power receiving section configured to receive power from a motor to switch the state of the second background plate. The first unit includes the motor, an intermediate cam configured to be rotated by the power from the motor, a holding member configured to hold the intermediate cam in a neutral position in a state in which the power of the motor is not transmitted to the intermediate cam, and a cam member configured to receive the power of the motor via the intermediate cam, the cam member having a receiving section of a size the power receiving section is received regardless of a position of the power receiving section when the intermediate cam is in the neutral position, the cam member configured to move the power receiving section by rotation.

According to this aspect, in a structure in which a power receiving section configured to switch the state of the second background plate in a second unit is moved by rotation of a cam member provided in a first unit, an intermediate cam member configured to rotate the cam member is held in a neutral position by a holding member and the cam member has a receiving section of a size the power receiving section is received regardless of a position of the power receiving section when the intermediate cam is in the neutral position. With this structure, when the second unit is closed from the opened state, collision of the power receiving section with the cam member can be prevented, and thus damage to the power receiving section and/or the cam member can be prevented.

In a second aspect of the present disclosure, in the first aspect, the holding member may comprise a torsion spring. According to this aspect, the holding member comprises a torsion spring and thus the holding member can have a simple structure and can be made at low cost.

In a third aspect of the present disclosure, in the first or second aspect, the first unit may be configured to change a pressing direction depending on the switching of the state of the first background plate, and include a first pressing member configured to press the first background plate to be in the facing state when the first background plate is switched to the facing state and press the first background plate to be in the non-facing state when the first background plate is switched to the non-facing state, and the second unit may be configured to change a pressing direction depending on the switching of the state of the second background plate, and include a second pressing member configured to press the second background plate to be in the facing state when the second background plate is switched to the facing state and press the second background plate to be in the non-facing state when the second background plate is switched to the non-facing state.

According to this aspect, the first background plate and the second background plate are pressed such that in either of the facing state or the non-facing state, the states of the first background plate and the second background plate are maintained respectively. Accordingly, the power consumption can be suppressed without performing hold control of the motor to maintain the states of the first background plate and the second background plate.

In a fourth aspect of the present disclosure, in any one of the first to third aspects, the image reading apparatus may include a position sensor configured to detect a position of the intermediate cam. According to this aspect, a position sensor configured to detect a position of the intermediate cam is provided. With this structure, in controlling the intermediate cam by the motor, the control can be accurately performed.

In a fifth aspect of the present disclosure, the image reading apparatus according to any one of the first to fourth aspects may include an open/close sensor configured to detect an open/close state of the second unit, and when the open/close sensor detects switching of the second unit from an opened state to a closed state, a control unit for controlling the motor drives the motor to switch the first background plate and the second background plate to the facing state or the non-facing state.

When the second unit is opened, the power receiving section may be directly operated by a user and when the second unit is closed, the state of the second background plate may be different from the state held by a control unit of the apparatus. To solve the problem, in this aspect, when an open/close sensor configured to detect an open/close state of the second unit detects that the second unit is switched from an opened state to a closed state, the motor is driven to switch the first background plate and the second background plate to the facing state or the non-facing state. Consequently, an unexpected user operation in opening the second unit can be appropriately managed. Hereinafter, embodiments of the present disclosure will be specifically described.

In the description below, an image reading apparatus according to an embodiment of the present disclosure will be described with reference to the drawings. In this embodiment, as an example image reading apparatus, a document scanner (hereinafter, simply referred to as a scanner 1A) that can read an image on at least one of a front side and a back side of a document (hereinafter, referred to as a document P), which is an example medium, will be described.

In an X-Y-Z coordinate system in the drawings, an X direction denotes an apparatus width direction and a document width direction, and a Y direction denotes a document transport direction. A Z direction intersects the Y direction and is approximately orthogonal to a surface of a document to be transported. A +Y direction denotes a front direction of the apparatus, and a −Y direction denotes a rear direction of the apparatus. When viewed from the front of the apparatus, the left denotes a +X direction, and the right denotes a −X direction. A +Z direction denotes an apparatus upper side (including an upper section, an upper surface, and the like), and a −Z direction denotes an apparatus lower side (including a lower section, a lower surface, and the like). A direction (+Y direction side) toward which a document P is fed may be referred to as "downstream" and the opposite direction (−Y direction side) may be referred to as "upstream".

Figure 5:
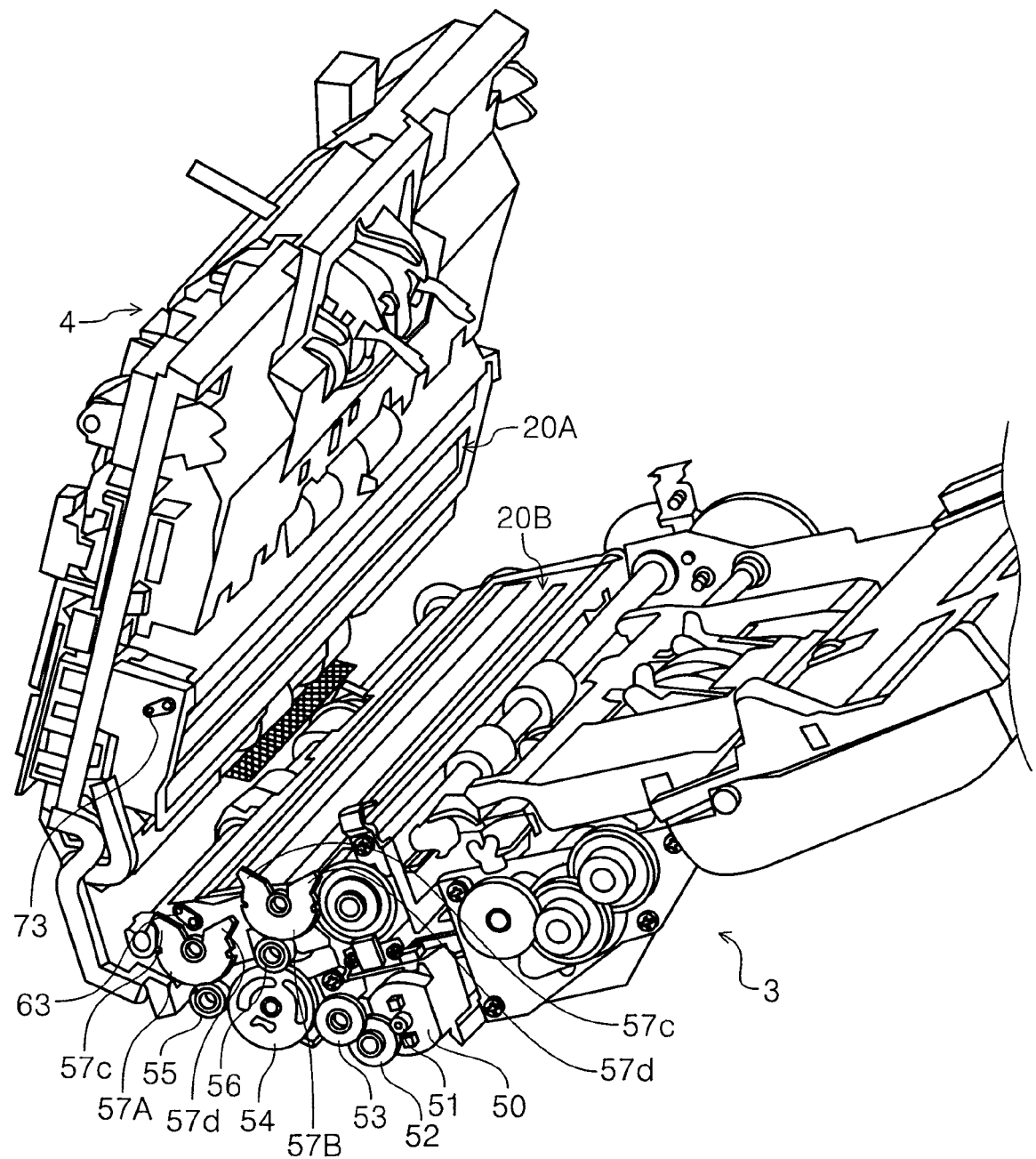
FIG. 5 is a perspective view illustrating an upper unit and a lower unit in which the upper unit is opened with respect to the lower unit.

The scanner 1A has an apparatus body 2 that includes in it a reading section 20 (FIG. 2) for reading an image on a document P. The apparatus body 2 includes a lower unit 3, which serves as a first unit, and an upper unit 4, which serves as a second unit. The upper unit 4 is openably and closably attached to the lower unit 3 so as to be rotated about its downstream side in a document transport direction with respect to the lower unit 3. The upper unit 4 can be rotated and opened toward the apparatus front side so as to expose a document transport path of a document P for a user to readily fix a jam of the document P. FIG. 5 illustrates the upper unit 4 that is opened with respect to the lower unit 3. In FIG. 5, casings of the upper unit 4 and the lower unit 3 are removed respectively.

A document mounting section 11 having a mounting surface 11a on which a document P to be fed can be mounted is provided on the rear side of the apparatus body 2. The document mounting section 11 can be detachably attached to the apparatus body 2. The document mounting section 11 is provided with a pair of edge guides 12 for guiding side edges of a document P in the width direction (X-axis direction) that intersects the feeding direction (Y-axis direction) of the document P.

The document mounting section 11 is provided with a first paper support 8 and a second paper support 9. The first paper support 8 and the second paper support 9 can be stored inside the document mounting section 11 and can be pulled out from the document mounting section 11 as illustrated in FIG. 1 such that the length of the mounting surface 11*a* can be adjusted.

The apparatus body 2 has an operation panel 7 on the apparatus front side of the upper unit 4. On the operation panel 7, a user interface (UI) for setting various settings for reading, for executing a reading operation, for displaying reading setting contents, or the like can be implemented. The operation panel 7 is a so-called touch panel through which display and input can be performed. The operation panel 7 serves also as an operation section for performing various operations and a display section for displaying various information. A feed port 6 that is connected to the inside of the apparatus body 2 is provided in an upper portion of the upper unit 4. A document P mounted on the document mounting section 11 is fed from the feed port 6 toward the reading section 20 provided in the apparatus body 2. A discharge tray 5 for receiving a discharged document P is disposed on the apparatus front side of the lower unit 3.

Figure 2:
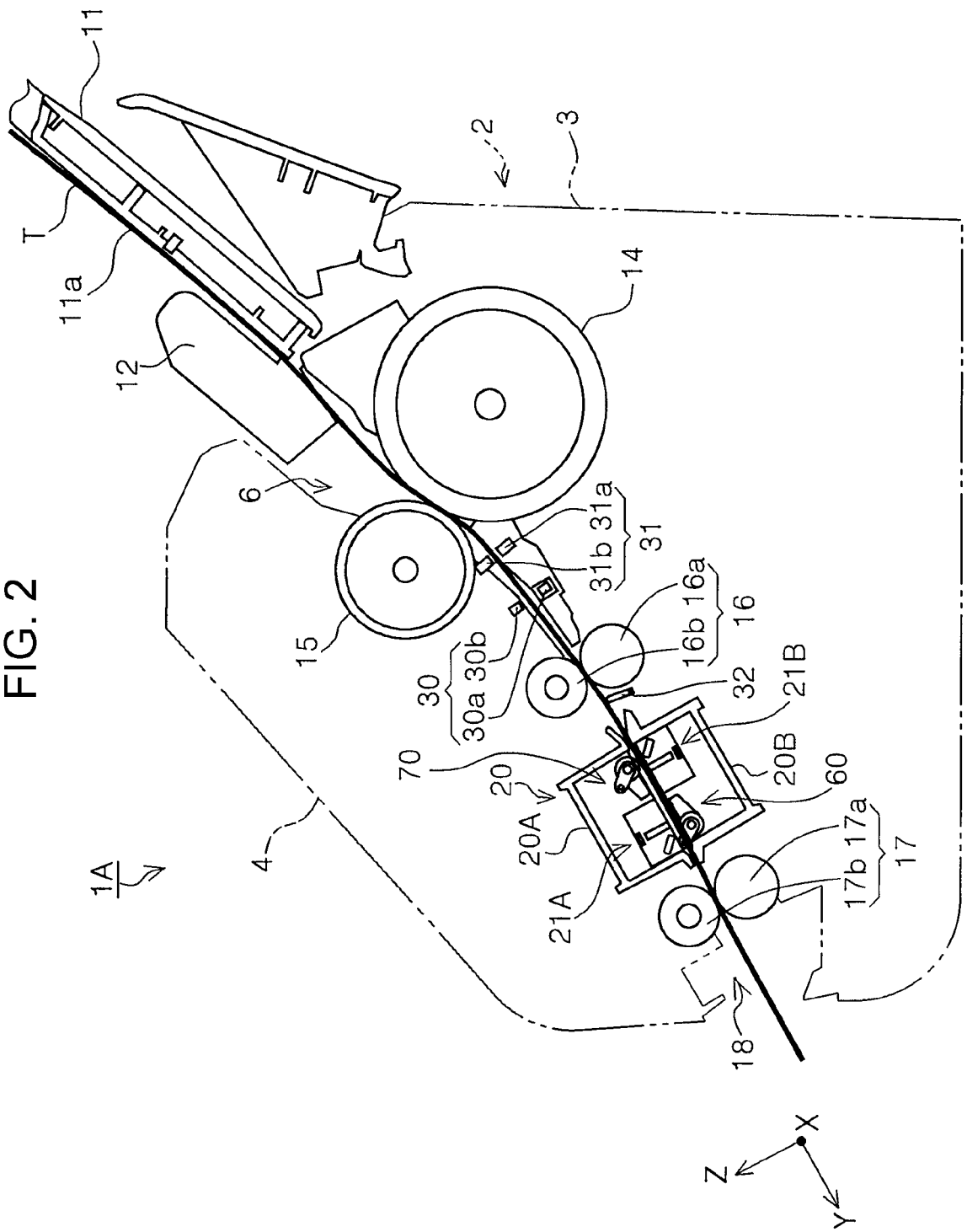
FIG. 2 is a side cross-sectional view of a document feeding path in a scanner according to an embodiment of the present disclosure.

Next, a document transport path in the scanner 1A will be described mainly with reference to FIG. 2. In FIG. 2, a solid line T indicates a document transport path, that is, a trajectory of a document P. The document transport path T is a space defined by the lower unit 3 and the upper unit 4.

The document mounting section 11 is disposed on the most upstream side of the document transport path T. On the downstream side of the document mounting section 11, a feeding roller 14 for feeding a document P mounted on the mounting surface 11*a* of the document mounting section 11 toward the reading section 20 and a separation roller 15 for nipping the document P with the feeding roller 14 and separating the document P are disposed.

The feeding roller 14 comes into contact with a lowermost document P of documents P mounted on the mounting surface 11*a* of the document mounting section 11. Accordingly, when a plurality of documents P are set on the document mounting section 11 in the scanner 1A, the documents P are fed sequentially from the document P on the side of the mounting surface 11*a* toward the downstream side. To the document mounting section 11, a sensor (not illustrated) for detecting whether a document P is mounted on the document mounting section 11 is provided.

Figure 3:
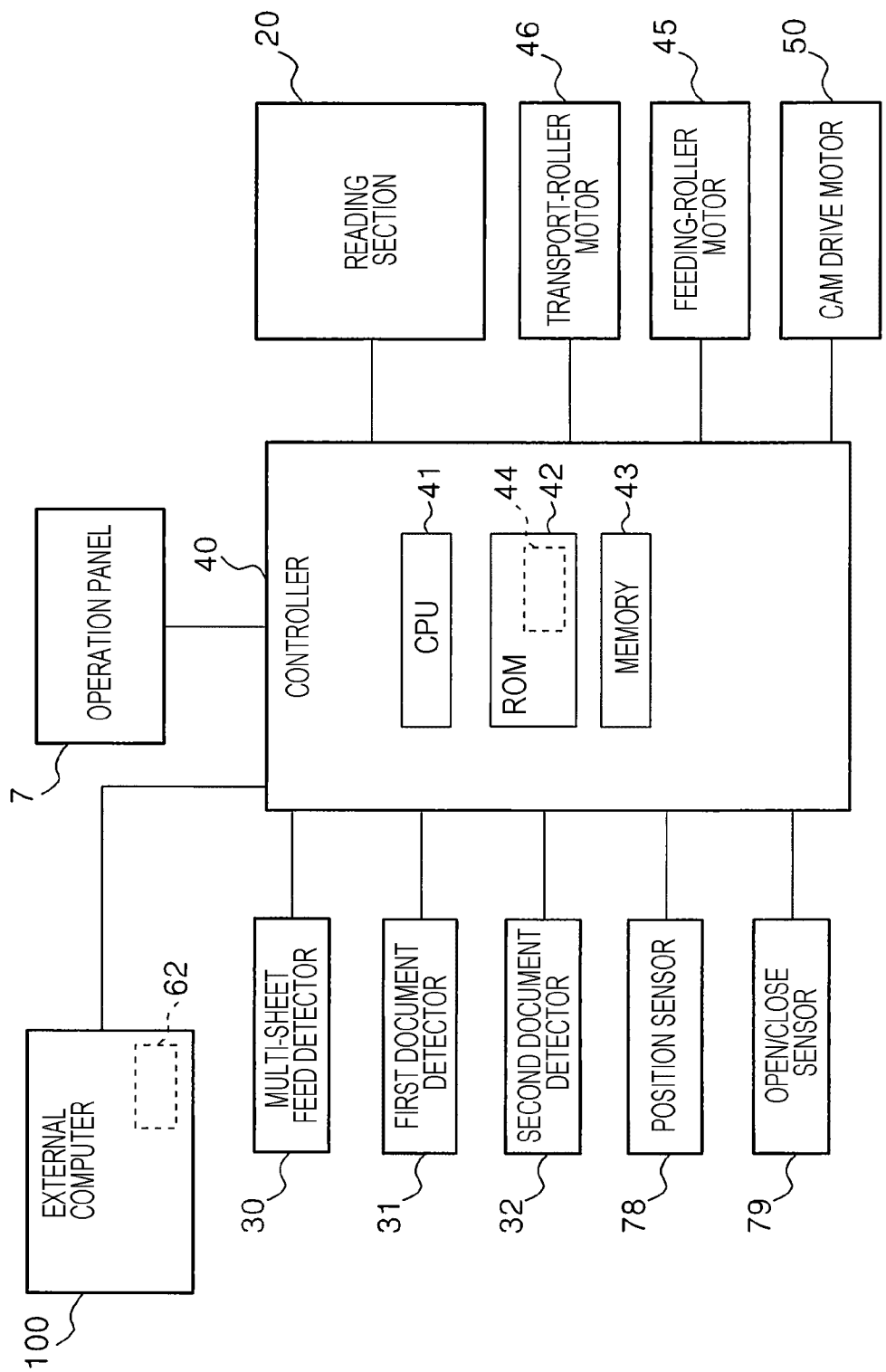
FIG. 3 is a block diagram of a control system in a scanner according to an embodiment of the present disclosure.

The feeding roller 14 is driven to rotate by a feeding-roller motor 45 (FIG. 3). With the rotation torque from the feeding-roller motor 45, the feeding roller 14 rotates in the counterclockwise direction in FIG. 2. To the separation roller 15, the rotation torque is transmitted from a transport-roller motor 46 (FIG. 3) via a torque limiter (not illustrated).

When no document P is provided or only one sheet of document P is provided between the feeding roller 14 and the separation roller 15, the separation roller 15 is rotated (in the clockwise direction in FIG. 2) due to the slippage in the torque limiter (not illustrated) irrespective of the rotation torque applied from the transport-roller motor 46. In addition to the document P being fed, if a second document P and subsequent documents P enter between the feeding roller 14 and the separation roller 15, a slippage will occur between the documents, and thus the separation roller 15 rotates in the counterclockwise direction in FIG. 2 with the rotation torque from the transport-roller motor 46. This rotation prevents or reduces multi-sheet feeding of the documents P.

A transport roller pair 16, the reading section 20 for reading images, and a discharging roller pair 17 are disposed on the downstream side of the feeding roller 14. The transport roller pair 16 includes a transport driving roller 16*a* that is driven to rotate by the transport-roller motor 46 (FIG. 3) and a transport driven roller 16*b* that follows the transport driving roller 16*a* to rotate. A document P nipped by the feeding roller 14 and the separation roller 15 and fed downstream is nipped by the transport roller pair 16 and transported to the reading section 20 disposed on the downstream side of the transport roller pair 16.

On the downstream side of the feeding roller 14, a first document detector 31 is disposed. The first document detector 31 is, for example, an optical sensor that includes a light emitting unit 31*a* and a light receiving unit 31*b* that face each other across the document feeding path T. The light receiving unit 31*b* sends an electrical signal that indicates the intensity of detection light to a controller 40 (FIG. 3). A document P being transported interrupts the detection light emitted from the light emitting unit 31*a* and the electrical signal indicating the intensity of the detection light changes. By the signal change, the controller 40 can detect the passage of a leading edge or a trailing edge of the document P.

On the downstream side of the first document detector 31, a multi-sheet feed detector 30 that detects a multiple sheet feed of documents P is disposed. The multi-sheet feed detector 30 includes an ultrasonic transmitter 30*a* and an ultrasonic receiver 30*b* for receiving ultrasonic waves that face each other across the document feeding path T. The ultrasonic receiver 30*b* sends an electrical signal that indicates the intensity of the detected ultrasonic waves to the controller 40 (FIG. 3). When a multiple sheet feed of documents P occurs, the electrical signal indicating the intensity of the ultrasonic waves changes and by the electric signal change, the controller 40 can detect the multiple sheet feed of the documents P.

On the downstream side of the multi-sheet feed detector 30, a second document detector 32 is disposed. The second document detector 32 is a contact sensor that has a lever. In response to passage of a leading edge or a trailing edge of a document P, the lever rotates and the electrical signal sent from the second document detector 32 to the controller 40 (FIG. 3) changes. By the signal change, the controller 40 can detect the passage of the leading edge or the trailing edge of the document P. The controller 40 can determine the location of the document P in the document feeding path T with the above-described first document detector 31 and the second document detector 32.

The reading section 20, which is disposed on the downstream side of the second document detector 32, includes an upper read sensor 20A, which is provided on the side of the upper unit 4 and serves as a second image sensor, and a lower read sensor 20B, which is provided on the side of the lower unit 3 and serves as a first image sensor. The upper read sensor 20A and the lower read sensor 20B according to the embodiment include a contact image sensor (CIS) module (CISM). The lower read sensor 20B reads a lower side, that is, a first side of a document P, and the upper read sensor 20A reads an upper side, that is, a second side of the document P.

As the contact image sensor module, the upper read sensor 20A includes an image sensor 21A, and the lower read sensor 20B includes an image sensor 21B. The lower read sensor 20B includes a first background unit 60 disposed so as to face the image sensor 21A on the upper side. The upper read sensor 20A includes a second background unit 70 disposed to face the image sensor 21B on the lower side.

Figure 6:
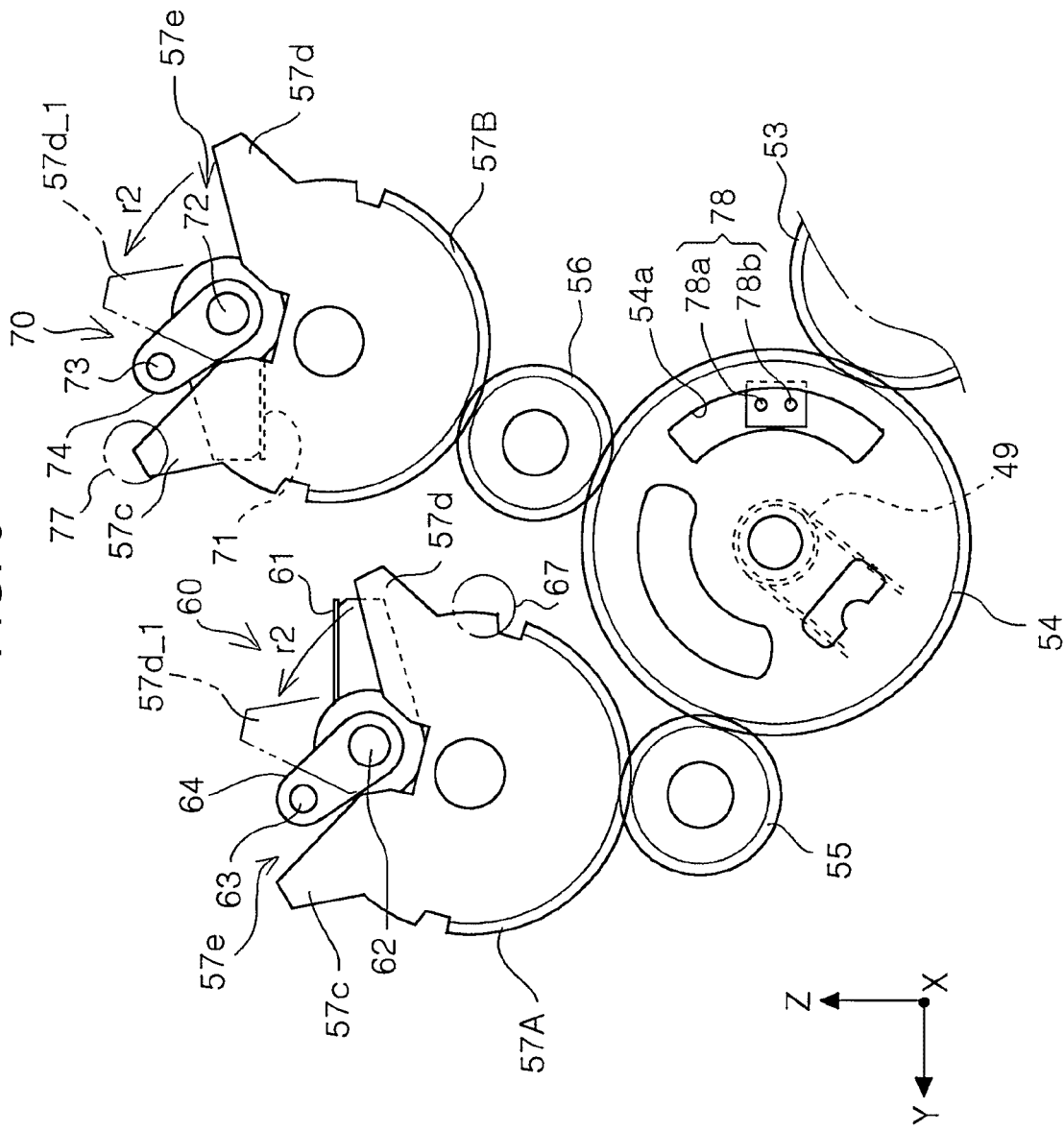
FIG. 6 is a front view illustrating a mechanism for switching a state of a first background plate and a state of a second background plate.

The first background unit 60 includes a first background plate 61 (FIG. 6) and the second background unit 70 includes a second background plate 71 (FIG. 6). The first background plate 61 and the second background plate 71 are used for shading correction, and read by the facing image sensors respectively. The background plates are, for example, resin plates such as white, gray, black, or the like or metal plates coated in white, gray, black or the like. As will be described below in detail, the first background plate 61 and the second background plate 71 can be rotated by the power of a motor, and by the rotation, can be switched between a facing state in which the first background plate 61 and the second background plate 71 face the facing image sensors respectively and a non-facing state. The first background plate 61 and the second background plate 71 according to the embodiment are, for example, white, and in the facing state, the first background plate 61 and the second background plate 71 can obtain a white reference value, and in the non-facing state, obtain a black reference value.

After an image on at least one of the first side and the second side of a document P has been read in the reading section 20, the document P is nipped by the discharging roller pair 17 that is disposed on the downstream side of the reading section 20 and discharged from a discharge port 18 that is provided on the apparatus front side of the lower unit 3. The discharging roller pair 17 includes a discharge driving roller 17a that is driven to rotate by the transport-roller motor 46 (FIG. 3) and a discharge driven roller 17b that follows the discharge driving roller 17a to rotate.

Hereinafter, with reference to FIG. 3, a control system in the scanner 1A will be described. FIG. 3 is a block diagram of a control system in the scanner 1A according to the embodiment of the present disclosure. In FIG. 3, the controller 40, which serves as a control unit, controls feeding and reading of a document P, and performs various kinds of control of the scanner 1A. To the controller 40, a signal from the operation panel 7 is input, and from the controller 40, a signal for the display on the operation panel 7, in particular, a signal for implementing a user interface (UI) is transmitted to the operation panel 7.

The controller 40 controls the feeding-roller motor 45, the transport-roller motor 46, and a cam drive motor 50. As described above, the feeding-roller motor 45 is a drive source for the feeding roller 14. The transport-roller motor 46 is a drive source for the separation roller 15, the transport roller pair 16, and the discharging roller pair 17. The cam drive motor 50 is a drive source for the first background unit 60 and the second background unit 70. To the controller 40, read data from the reading section 20 is input, and from the controller 40, a signal for controlling the reading section 20 is transmitted to the reading section 20. To the controller 40, detection signals from detection sections, that is, the multi-sheet feed detector 30, the first document detector 31, the second document detector 32, and a position sensor 78 (described below) are also input, and based on the detection signal, necessary control is performed.

The controller 40 includes a central processing unit (CPU) 41, a read-only memory (ROM) 42, and a memory 43. The CPU 41 performs various processing operations in accordance with a program 44 that is stored in the ROM 42 to perform overall control of the scanner 1A. The memory 43, which is an example storage section, is a readable and writable nonvolatile memory. All data necessary for abnormality detection described below are stored in the memory 43. The controller 40 writes predetermined data in the memory 43 as necessary. The program 44 stored in the ROM 42 is not always one program, and may consist of a plurality of programs including an abnormality detection program according to the embodiment, which will be described below, a program for controlling an UI displayed on the operation panel 7, and various control programs necessary for transporting and reading of a document.

The scanner 1A can be connected to an external computer 100. To the controller 40, information is input from the external computer 100 and based on the information, the controller 40 performs a necessary control operation.

Figure 4:
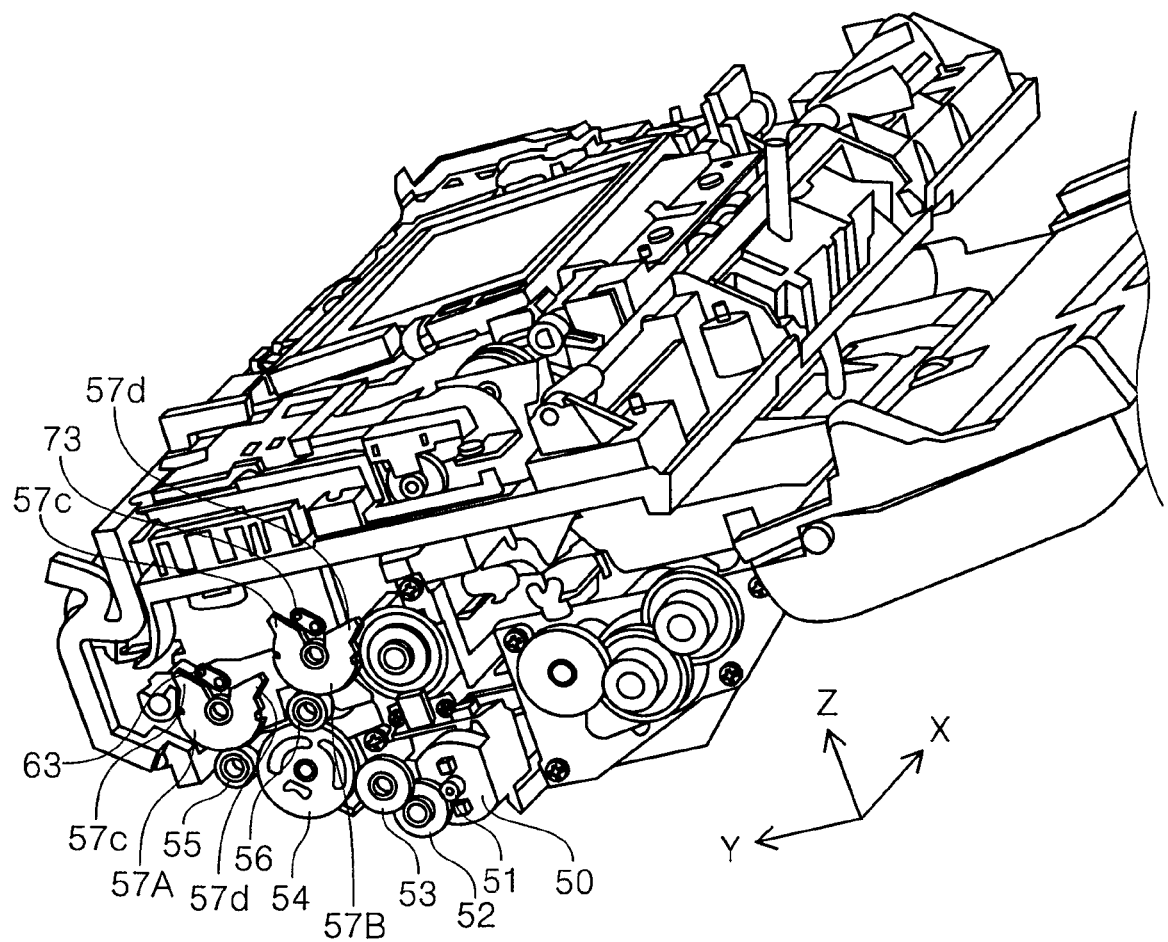
FIG. 4 is a perspective view illustrating an upper unit and a lower unit in which the upper unit is closed with respect to the lower unit.

With reference to FIG. 4 and subsequent drawings, the switching of the background plates will be described. As described above with reference to FIG. 2, the lower read sensor 20B includes the first background unit 60 disposed so as to face the image sensor 21A on the upper side, and the upper read sensor 20A includes the second background unit 70 disposed to face the image sensor 21B on the lower side. The first background unit 60 includes the first background plate 61, and the second background unit 70 includes the second background plate 71 as illustrated in FIG. 6. The first background plate 61 and the second background plate 71 can be switched between the facing state (FIG. 6) in which the first background plate 61 and the second background plate 71 face the image sensors on the opposite sides respectively and the non-facing state (FIG. 7) in which the facing state in which the first background plate 61 and the second background plate 71 face the image sensors on the opposite sides respectively is released. Note that the terms "facing state" and "non-facing state" mean states of the first background plate 61 and the second background plate 71; however, in the description below, for the sake of convenience, states of the first background unit 60 that includes the first background plate 61 and the components of the first background unit 60, and states of the second background unit 70 that includes the second background plate 71 and the components of the second background unit 70 may be expressed using the terms "facing state" and "non-facing state".

Hereinafter, a mechanism for switching the states of the background plates will be described. As illustrated in FIG. 4 and FIG. 5, the lower unit 3 includes the cam drive motor 50. The driving force of the cam drive motor 50 is transmitted to an intermediate cam 54 via gears 51, 52, and 53. When the intermediate cam 54 rotates, the rotation is transmitted to a first cam member 57A via a gear 55 and also to a second cam member 57B via a gear 56. The first cam member 57A is a cam for rotating the first background unit 60 (FIG. 6) including the first background plate 61 (FIG. 6), and the second cam member 57B is a cam for rotating the second background unit 70 (FIG. 6) including the second background plate 71 (FIG. 6).

Figure 7:
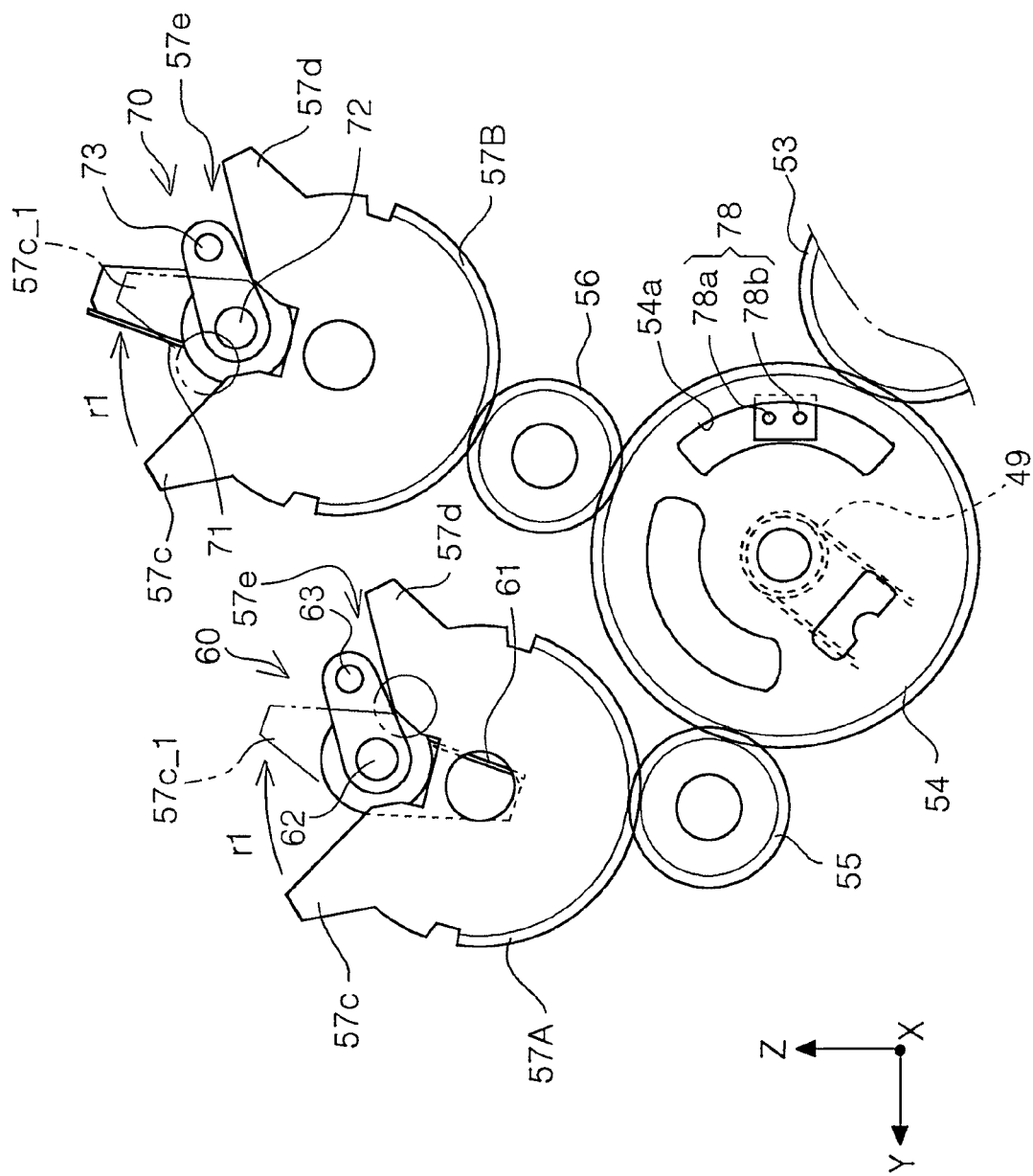
FIG. 7 is a front view illustrating a mechanism for switching a state of a first background plate and a state of a second background plate.

As illustrated in FIG. 6 and FIG. 7, the first background unit 60 can be rotated about a shaft 62, and similarly, the second background unit 70 can be rotated about a shaft 72. The rotation of the first background unit 60 about the shaft 62 causes the first background plate 61 to be switched between the facing state (FIG. 6) and the non-facing state (FIG. 7). Similarly, the rotation of the second background unit 70 about the shaft 72 causes the second background plate 71 to be switched between the facing state (FIG. 6) and the non-facing state (FIG. 7).

The first background unit 60 includes an arm 64 that radially extends from the shaft 62, and the arm 64 has a first protrusion 63. The first protrusion 63 protrudes in the axial direction of the shaft 62 and is received between a first arm portion 57c and a second arm portion 57d of the first cam member 57A. Specifically, the first arm portion 57c and the second arm portion 57d form a receiving section 57e for receiving the first protrusion 63. Similarly, the second background unit 70 includes an arm 74 that radially extends from the shaft 72, and the arm 74 has a second protrusion 73 that serves as a power receiving section. The second protrusion 73 protrudes in the axial direction of the shaft 72 and is received between a first arm portion 57c and a second arm portion 57d of the second cam member 57B. Specifically, the first arm portion 57c and the second arm portion 57d form a receiving section 57e for receiving the second protrusion 73.

As will be described in detail below, the intermediate cam 54 illustrated in FIG. 6 and FIG. 7 are in a neutral position. When the intermediate cam 54 is in the neutral position, the first cam member 57A and the second cam member 57B are in positions as illustrated in FIG. 6 and FIG. 7.

When the first background plate 61 and the second background plate 71 are in the facing state (FIG. 6), in response to the rotation of the cam drive motor 50, the first cam member 57A is rotated in the clockwise direction in FIG. 6, the first arm portion 57c is moved in an arrow r1 direction in FIG. 7, and the first protrusion 63 is moved in the right direction in FIG. 7. After the operation, the first arm portion 57c is located in a position 57c_1. By the operation, as illustrated in the change from FIG. 6 to FIG. 7, the first background unit 60 is rotated in the clockwise direction in the drawings, and the first background plate 61 is switched from the facing state to the non-facing state. Similarly, in response to the rotation of the cam drive motor 50, the second cam member 57B is rotated in the clockwise direction in FIG. 6, the first arm portion 57c is moved in an arrow r1 direction in FIG. 7, and the second protrusion 73 is moved in the right direction in FIG. 7. After the operation, the first arm portion 57c is located in a position 57c_1. By the operation, as illustrated in the change from FIG. 6 to FIG. 7, the second background unit 70 is rotated in the clockwise direction in the drawings and the second background plate 71 is switched from the facing state to the non-facing state.

On the other hand, when the first background plate 61 and the second background plate 71 are in the non-facing state (FIG. 7), in response to the rotation of the cam drive motor 50, the first cam member 57A is rotated in the counterclockwise direction in FIG. 7, the second arm portion 57d is moved in an arrow r2 direction in FIG. 6, and the first protrusion 63 is moved in the left direction in FIG. 6. After the operation, the second arm portion 57d is located in a position 57d_1. By the operation, as illustrated in the change from FIG. 7 to FIG. 6, the first background unit 60 is rotated in the counterclockwise direction in the drawings, and the first background plate 61 is switched from the non-facing state to the facing state. Similarly, in response to the rotation of the cam drive motor 50, the second cam member 57B is rotated in the counterclockwise direction in FIG. 7, the second arm portion 57d is moved in the arrow r2 direction in FIG. 6, and the second protrusion 73 is moved in the left direction in FIG. 6. After the operation, the second arm portion 57d is located in a position 57d_1. By the operation, as illustrated in the change from FIG. 7 to FIG. 6, the second background unit 70 is rotated in the counterclockwise direction in the drawings, and the second background plate 71 is switched from the non-facing state to the facing state.

Figure 8:
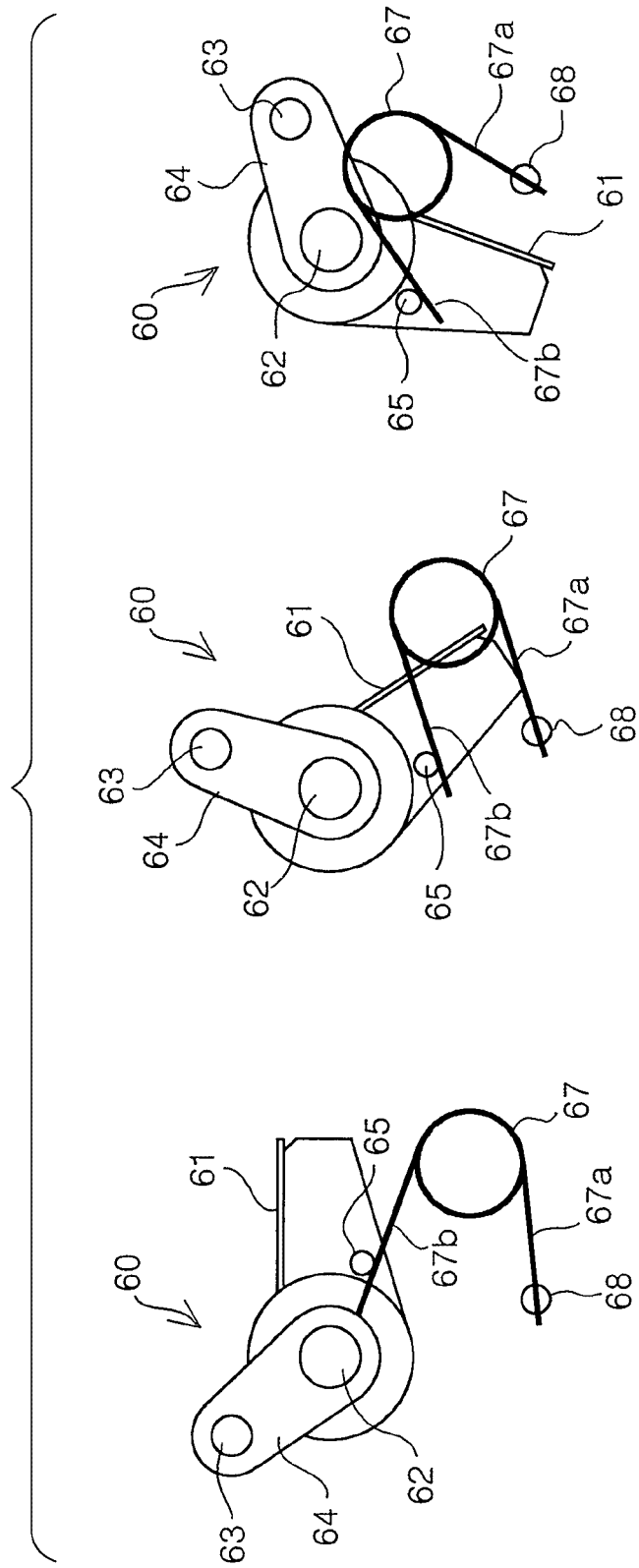
FIG. 8 is a front view illustrating a first pressing member for pressing a first background plate.

The first background unit 60 and the second background unit 70 are respectively pressed by pressing members to be in the facing state when in the facing state and to be in the non-facing state when in the non-facing state. More specifically, as illustrated in FIG. 8, a pressing force is applied to the first background unit 60 by a torsion spring 67, which serves as a first pressing member. One end 67b of the torsion spring 67 applies a pressing force to a spring hooking portion 65 in the first background unit 60, and the other end 67a is engaged with a spring hooking portion 68 that is provided to a frame (not illustrated).

In the left view in FIG. 8, the first background unit 60 is in the facing state. In this state, the opening force of the torsion spring 67 acts to rotate the first background unit 60 in the counterclockwise direction in FIG. 8, that is, the torsion spring 67 presses the first background unit 60 such that the first background unit 60 is in the facing state. In other words, the torsion spring 67 presses the first background unit 60 to maintain the facing state of the first background unit 60. When the first background unit 60 is rotated from this state to become the non-facing state, the state changes from the state in the left view through the state in the middle view to the state in the right view in FIG. 8. In the process of the change, the orientation of the torsion spring 67 is changed, and the direction of pressing the first background unit 60 by the torsion spring 67 is changed from the counterclockwise direction in FIG. 8, that is, the direction of pressing to be in the facing state, to the clockwise direction in FIG. 8, that is, the direction of pressing to be in the non-facing state.

Specifically, when the first background unit 60 is in the non-facing state, the opening force of the torsion spring 67 acts to rotate the first background unit 60 in the clockwise direction in FIG. 8, that is, the torsion spring 67 presses the first background unit 60 such that the first background unit 60 is in the non-facing state. In other words, the torsion spring 67 presses the first background unit 60 to maintain the non-facing state of the first background unit 60. With this operation, the first background unit 60 is pressed by the torsion spring 67 to be in the facing state when in the facing state and to be in the non-facing state when in the non-facing state. Similarly, the second background unit 70 is pressed by a torsion spring 77 (FIG. 6, FIG. 7) to be in the facing state when in the facing state and to be in the non-facing state when in the non-facing state. The structure for pressing the second background unit 70 is similar to that of the first background unit 60 illustrated in FIG. 8, and thus the detailed structure is not illustrated and described.

The intermediate cam 54 disposed in the lower unit 3 in FIG. 6 and FIG. 7 is held in an intermediate position by a torsion spring 49, which serves as a holding member. The intermediate position of the intermediate cam 54 is a position illustrated in FIG. 6 and FIG. 7. When the intermediate cam 54 is in the intermediate position, a movable range of the first protrusion 63 is inside the receiving section 57e of the first cam member 57A. Accordingly, at any position, the first protrusion 63 does not come into contact with the first cam member 57A. Similarly, when the intermediate cam 54 is in the intermediate position, a movable range of the second protrusion 73 is inside the receiving section 57e of the second cam member 57B. Accordingly, at any position, the second protrusion 73 does not come into contact with the second cam member 57B. The intermediate cam 54 is held in the intermediate position by the torsion spring 49. Accordingly, after the intermediate cam 54 is rotated by the cam drive motor 50 to switch the state of the first background plate 61 and the second background plate 71, if the cam drive motor 50 is stopped and the hold-driving of the cam drive motor 50 is not performed, the intermediate cam 54 returns to the intermediate position illustrated in FIG. 6 and FIG. 7.

In FIG. 6 and FIG. 7, all the components except the second background unit 70 are disposed in the lower unit 3 and only the second background unit 70 is disposed in the upper unit 4. When the upper unit 4 is opened, as illustrated in FIG. 5, the second protrusion 73 in the second background unit 70 is separated from the second cam member 57B. In such a state, the second protrusion 73 may be operated by a user and may be switched from the facing state to the non-facing state or from the non-facing state to the facing state. This means that the state of the second background unit 70 held by the controller 40 may differ from the actual state of the second background unit 70.

To solve the problem, in this embodiment, the lower unit 3 is provided with the cam drive motor 50, the intermediate cam 54 that is rotated by the power from the cam drive motor 50, the torsion spring 49 that serves as the holding member for holding the intermediate cam 54 in the neutral position in a state in which the power of the cam drive motor 50 is not transmitted to the intermediate cam 54, and the second cam member 57B that receives the power from the cam drive motor 50 via the intermediate cam 54 and is rotated to move the second protrusion 73 that serves as the power receiving section. Furthermore, the receiving section 57e of the second cam member 57B has the size the second protrusion 73 can be received regardless of the position of the second protrusion 73 when the intermediate cam 54 is in the neutral position. With this structure, when the upper unit 4 is closed from the opened state, collision of the second protrusion 73 with the second cam member 57B can be prevented, and thus damage to the second protrusion 73 and/or the second cam member 57B can be prevented.

Figure 9:
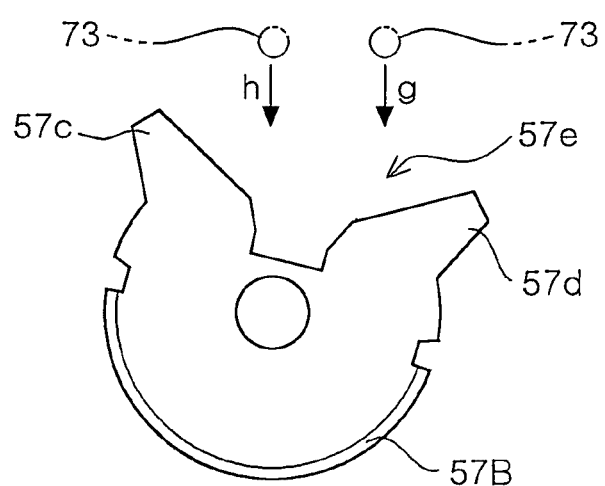
FIG. 9 is a front view illustrating a second cam member.

For example, in FIG. 9, an arrow g indicates a movement trajectory of the second protrusion 73 that is in the non-facing state and moved toward the receiving section 57e when the upper unit 4 is closed from the opened state, and an arrow h indicates a movement trajectory of the second protrusion 73 that is in the facing state and moved toward the receiving section 57e when the upper unit 4 is closed from the opened state. In either the facing state or the non-facing state, when the upper unit 4 is closed from the opened state, the second protrusion 73 can be prevented from colliding with the first arm portion 57c or the second arm portion 57d of the second cam member 57B.

In this embodiment, the holding member for holding the intermediate cam 54 in the neutral position comprises the torsion spring 49, and thus the holding member can have the simple structure and can be made at low cost.

Furthermore, the embodiment includes the torsion spring 67 that serves as the first pressing member for pressing the first background plate 61 that is in the facing state to be in the facing state and pressing the first background plate 61 that is in the non-facing state to be in the non-facing state. Furthermore, the embodiment includes the torsion spring 77 that serves as the second pressing member for pressing the second background plate 71 that is in the facing state to be in the facing state and pressing the second background plate 71 that is in the non-facing state to be in the non-facing state. With this structure, the power consumption can be suppressed without performing hold control of the cam drive motor 50 to maintain the state of each background plate.

Furthermore, as illustrated in FIG. 6 and FIG. 7, the embodiment includes the position sensor 78 that detects a position of the intermediate cam 54. The position sensor 78 includes a first detection section 78a and a second detection section 78b. The first detection section 78a and the second detection section 78b serve as an optical sensor and are disposed in an arc-shaped groove 54a that is formed in the intermediate cam 54. For example, when the intermediate cam 54 is rotated in the clockwise direction from the state in FIG. 6 and FIG. 7, only the first detection section 78a is interrupted, and thereby the controller 40 can detect that the first background plate 61 and the second background plate 71 are switched from the facing state (FIG. 6) to the non-facing state (FIG. 7). On the other hand, when the intermediate cam 54 is rotated in the counterclockwise direction from the state in FIG. 6 and FIG. 7, only the second detection section 78b is interrupted, and thereby the controller 40 can detect that the first background plate 61 and the second background plate 71 are switched from the non-facing state (FIG. 7) to the facing state (FIG. 6). With this structure, the controller 40 can accurately control the respective background plates.

Figure 10:
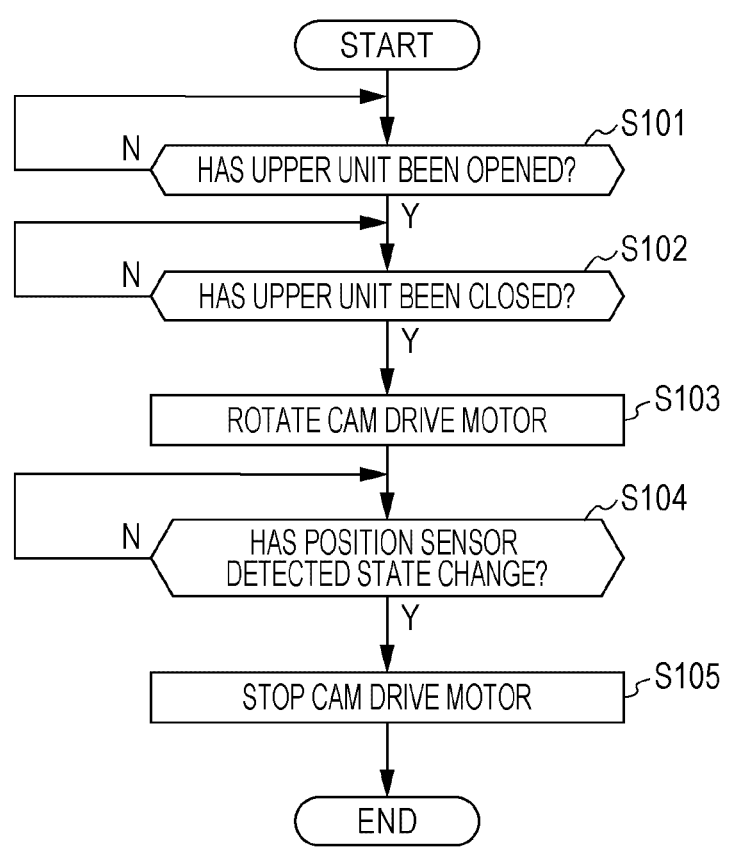
FIG. 10 is a flowchart illustrating a control procedure to be performed when an upper unit is opened or closed.

This embodiment includes an open/close sensor 79 (FIG. 3) that is used to detect an open/close state of the upper unit 4. When the open/close sensor 79 detects that the upper unit 4 is switched from an opened state to a closed state, the controller 40 drives the cam drive motor 50 to switch the first background plate 61 and the second background plate 71 to the facing state or the non-facing state. More specifically, in FIG. 10, when the controller 40 detects that the upper unit 4 has been opened (Yes in step S101), the controller 40 monitors that the upper unit 4 has been closed (step S102). When the upper unit 4 has been closed (Yes in step S102), the controller 40 causes the cam drive motor 50 to rotate (step S103). In this step, the rotation direction of the cam drive motor 50 may be a direction in which the first background plate 61 and the second background plate 71 are switched to the facing state, or may be a direction in which the first background plate 61 and the second background plate 71 are switched to the non-facing state. When the position sensor 78 detects a state change (Yes in step S104), the driving of the cam drive motor 50 is stopped (step S105). With this operation, the intermediate cam 54 returns to the neutral position.

With the above-described operation, the following operational advantages can be obtained. As described above, when the upper unit 4 is opened, the second protrusion 73 may be directly operated by a user and the state of the second background plate 71 may be switched, as a result, the state of the second background plate 71 may be different from the state held by the controller 40. To solve the problem, as described above, when the open/close sensor 79 (FIG. 3) detects that the upper unit 4 is switched from an opened state to a closed state, the cam drive motor 50 is driven to switch the first background plate 61 and the second background plate 71 to the facing state or the non-facing state. Consequently, an unexpected user operation in opening the upper unit 4 can be appropriately managed.

In the above-described embodiment, the first cam member 57A has substantially the same shape as the second cam member 57B. However, both of the first protrusion 63 that is moved by the first cam member 57A and the first cam member 57A are disposed in the lower unit 3 and not separated. Accordingly, it is not always necessary that the first cam member 57A has substantially the same shape as the second cam member 57B.

What is claimed is:

1. An image reading apparatus comprising:
a first unit including a first image sensor configured to read a first side of a document; and
a second unit configured to be opened or closed with respect to the first unit, the second unit including a second image sensor configured to read a second side opposite to the first side of the document, wherein
the first unit includes a first background plate configured to be switched between a facing state in which the first background plate faces the second image sensor and a non-facing state in which the facing state of the first background plate and the second image sensor is released, the second unit includes a second background plate configured to be switched between a facing state in which the second background plate faces the first image sensor and a non-facing state in which the facing state of the second background plate and the first image sensor is released, and a power receiving section configured to receive power from a motor to switch the state of the second background plate, the first unit includes the motor;

an intermediate cam configured to be rotated by the power from the motor;

a holding member configured to hold the intermediate cam in a neutral position in a state in which the power of the motor is not transmitted to the intermediate cam; and a cam member configured to receive the power of the motor via the intermediate cam, the cam member having a receiving section of a size the power receiving section is received regardless of a position of the power receiving section when the intermediate cam is in the neutral position, the cam member configured to move the power receiving section by rotation.

2. The image reading apparatus according to claim 1, wherein the holding member comprises a torsion spring.

3. The image reading apparatus according to claim 1, wherein the first unit is configured to change a pressing direction depending on the switching of the state of the first background plate, and includes a first pressing member configured to press the first background plate to be in the facing state when the first background plate is switched to the facing state and press the first background plate to be in the non-facing state when the first background plate is switched to the non-facing state, and the second unit is configured to change a pressing direction depending on the switching of the state of the second background plate, and includes a second pressing member configured to press the second background plate to be in the facing state when the second background plate is switched to the facing state and press the second background plate to be in the non-facing state when the second background plate is switched to the non-facing state.

4. The image reading apparatus according to claim 1, further comprising:

a position sensor configured to detect a position of the intermediate cam.

5. The image reading apparatus according to claim 1, further comprising:

an open/close sensor configured to detect an open/close state of the second unit, wherein when the open/close sensor detects switching of the second unit from an opened state to a closed state, a control unit for controlling the motor drives the motor to switch the first background plate and the second background plate to the facing state or the non-facing state.

* * * * *